(12) United States Patent
Mizuno et al.

(10) Patent No.: US 10,246,004 B2
(45) Date of Patent: Apr. 2, 2019

(54) VEHICLE HEADLIGHT CONTROL APPARATUS

(71) Applicants: DENSO CORPORATION, Kariya (JP); TOYOTA JIDOSHA KABUSHIKI KAISHA, Toyota-shi (JP); KOITO MANUFACTURING CO., LTD., Minato-ku (JP)

(72) Inventors: Ryu Mizuno, Kariya (JP); Shinichi Futamura, Kariya (JP); Tatsuya Takagaki, Nisshin (JP); Takatoshi Nakagawa, Toyota (JP); Kiyotaka Mochizuki, Minato-ku (JP); Takao Muramatsu, Minato-ku (JP)

(73) Assignees: DENSO CORPORATION, Kariya, Aichi-pref. (JP); TOYOTA JIDOSHA KABUSHIKI KAISHA, Toyota-shi, Aichi-pref. (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/736,114

(22) PCT Filed: May 24, 2016

(86) PCT No.: PCT/JP2016/065263
§ 371 (c)(1),
(2) Date: Dec. 13, 2017

(87) PCT Pub. No.: WO2016/203911
PCT Pub. Date: Dec. 22, 2016

(65) Prior Publication Data
US 2018/0170243 A1 Jun. 21, 2018

(30) Foreign Application Priority Data

Jun. 15, 2015 (JP) .................. 2015-120467

(51) Int. Cl.
*B60Q 1/04* (2006.01)
*B60Q 1/14* (2006.01)
*H05B 33/08* (2006.01)
*F21Y 115/10* (2016.01)
(Continued)

(52) U.S. Cl.
CPC ............ *B60Q 1/143* (2013.01); *B60Q 1/14* (2013.01); *H05B 33/0854* (2013.01);
(Continued)

(58) Field of Classification Search
CPC .... B60Q 1/14; B60Q 1/1423; B60Q 2300/41; B60Q 2300/42; B60Q 2300/056;
(Continued)

(56) References Cited

U.S. PATENT DOCUMENTS 6,254,259 B1 * 7/2001 Kobayashi ............ B60Q 1/085
340/459
7,972,045 B2 * 7/2011 Schofield ............ B60Q 1/1423
362/466
(Continued)

FOREIGN PATENT DOCUMENTS

JP 63-038052 A 2/1988
JP 2007-112250 A 5/2007
(Continued)

*Primary Examiner* — Haissa Philogene
(74) *Attorney, Agent, or Firm* — Knobbe, Martens, Olson & Bear, LLP

(57) ABSTRACT

A vehicle headlight control apparatus controls headlights of a vehicle including LEDs. The vehicle headlight control apparatus includes: drivers and each of which gradually changes a luminance of the LEDs between a predetermined on state and a predetermined off state over a switching time period; and a lamp ECU that determines the switching time period in a changeable manner.

19 Claims, 6 Drawing Sheets

(51) Int. Cl.
*F21S 41/25* (2018.01)
*F21S 41/663* (2018.01)
*F21S 41/141* (2018.01)
*F21S 41/40* (2018.01)

(52) U.S. Cl.
CPC ...... *B60Q 2300/41* (2013.01); *B60Q 2300/42* (2013.01); *F21S 41/141* (2018.01); *F21S 41/25* (2018.01); *F21S 41/40* (2018.01); *F21S 41/663* (2018.01); *F21Y 2115/10* (2016.08)

(58) Field of Classification Search
CPC ........ B60Q 1/02; B60Q 1/04; H05B 33/0842; H05B 33/0845; H05B 37/02; H05B 33/0854; F21S 41/25; F21S 41/40; F21S 41/663; F21S 41/141; F21Y 2115/10; H04N 5/2253; H04N 5/2257
See application file for complete search history.

(56) References Cited

U.S. PATENT DOCUMENTS

| | | | |
|---|---|---|---|
| 8,007,146 B2 * | 8/2011 | Tatara | B60Q 1/1423 362/464 |
| 10,059,252 B2 * | 8/2018 | Mizuno | B60Q 1/14 |
| 2013/0242100 A1 | 9/2013 | Seki | |
| 2018/0014395 A1 * | 1/2018 | Ichikawa | H05B 37/0281 |

FOREIGN PATENT DOCUMENTS

| | | |
|---|---|---|
| JP | 2013-154746 A | 8/2013 |
| JP | 2013-184602 A | 9/2013 |
| JP | 2014-054892 | 3/2014 |
| JP | 2014-054892 A | 3/2014 |
| JP | 2014/136505 | 7/2014 |
| JP | 2014-136505 A | 7/2014 |

* cited by examiner

FIG.13
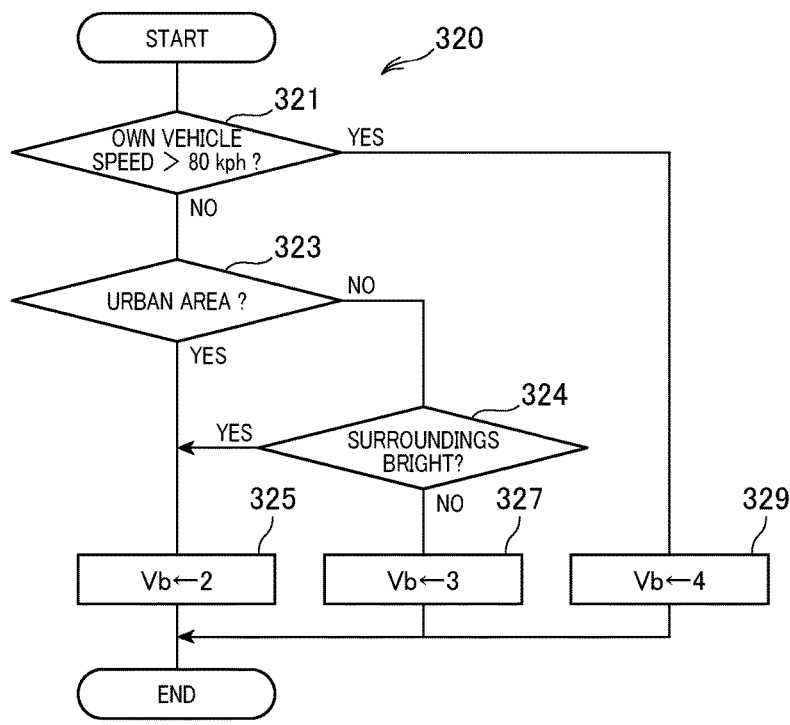
FIG.14
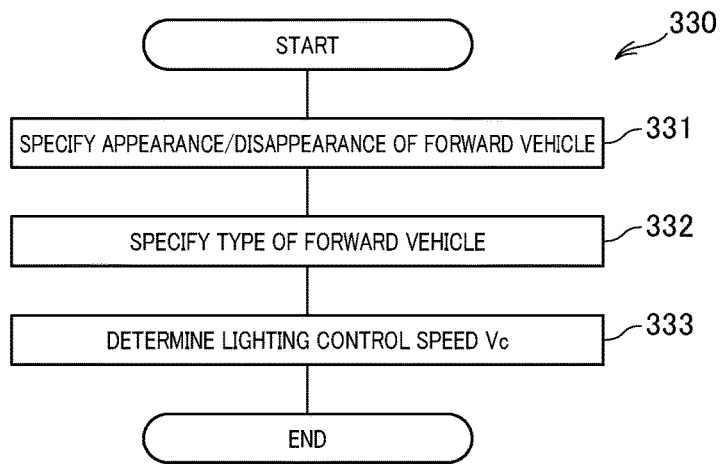
FIG.15
|  | PRECEDING VEHICLE | ONCOMING VEHICLE |
|---|---|---|
| APPEARED | Vc←3 | Vc←3 |
| DISAPPEARED | Vc←2 | Vc←4 |
| NEITHER | Vc←1 | |

VEHICLE HEADLIGHT CONTROL APPARATUS

TECHNICAL FIELD

The present invention relates to a vehicle headlight control apparatus.

BACKGROUND ART

Vehicle headlights including a plurality of LEDs are well known. As an apparatus for controlling such a headlight of a vehicle, Patent Literature 1 discloses a technique for turning off selected LEDs in the plurality of LEDs; the selected LEDs correspond to the position of a preceding vehicle detected by a camera. This exerts an antiglare effect with respect to the preceding vehicle.

CITATION LIST

Patent Literature

[PTL 1] JP 2013-184602 A

SUMMARY OF THE INVENTION

Technical Problem

According to the inventors' detailed study, however, excessively sudden change of light from the LEDs when the LEDs are turned on or off may cause the driver of the vehicle to be likely to feel uneasy. Conversely, excessively slow change of light from the LEDs when the LEDs are turned on or off may cause the driver of the vehicle to be likely not to have a proper visual field.

In light of the matters described above, an object of the present invention is to provide a technique, in a vehicle headlight control apparatus for controlling one or more light sources, for properly controlling the time taken for turning on or off the light sources according to the situation.

Solution to Problem

In order to achieve the above object, the invention recited in claim 1 provides a vehicle headlight control apparatus that controls a headlight of a vehicle including at least one LED. The vehicle headlight control apparatus includes: a luminance changing section that gradually changes a luminance of the at least one LED between a predetermined on state and a predetermined off state over a switching time period; and a time period determining section that determines the switching time period in a changeable manner.

As mentioned above, the luminance changing section gradually changes the luminance of the at least one LED between the on state and the off state over the switching time period, and the time period determining section determines the switching time period in the changeable manner. This makes it possible to properly control the time taken for turning on or off the LED according to the situation.

Note that each reference sign in a parenthesis set forth above and in the claims indicates the correspondence relationship between a corresponding term recited in the claims and a corresponding element or the like concretely described in the following embodiment.

BRIEF DESCRIPTION OF THE DRAWINGS

FIG. 13 is a flow diagram illustrating a lighting control speed acquisition process based on traveling environment.

FIG. 14 is a flow diagram illustrating lighting control speed acquisition process based on forward vehicle.

FIG. 15 is a lighting control speed selection table used for the lighting control speed acquisition process based on forward vehicle.

DESCRIPTION OF THE EMBODIMENTS

Figure 1:
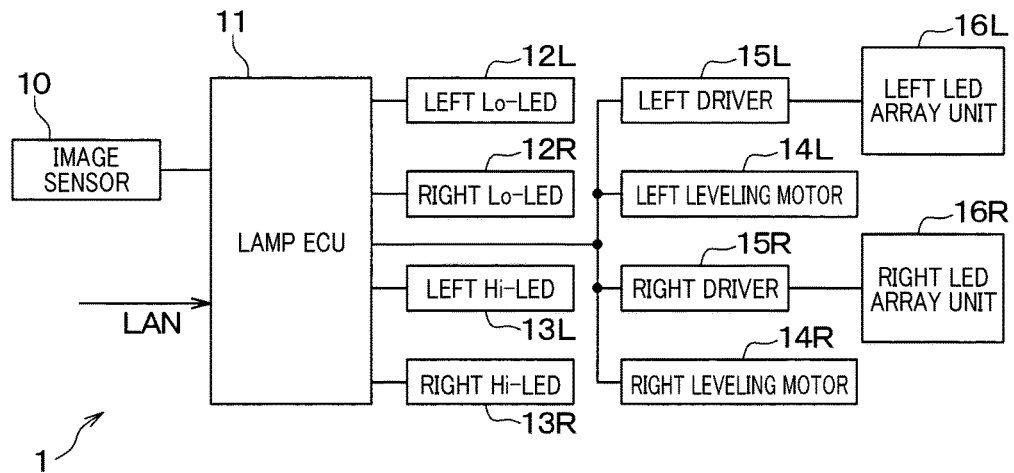
FIG. 1 is a schematic diagram illustrating a vehicle headlight control system.

The following description will discuss an embodiment of the present invention. As illustrated in FIG. 1, a vehicle headlight control system according to the present embodiment includes an image sensor 10, a lamp ECU 11, a left Lo-LED 12L, a right Lo-LED 12R, a left Hi-LED 13L, a right Hi-LED 13R, a left leveling motor 14L, a right leveling motor 14R, a left driver 15L, a right driver 15R, a left LED array unit 16L, and a right LED array unit 16R.

The vehicle headlight includes a left lighting device provided at a front left end of the vehicle and a right lighting device provided at a front right end of the vehicle. The left lighting device includes the LEDs 12L and 13L, and the left LED array unit 16L. The right lighting device includes the LEDs 12R and 13R, and the right LED array unit 16R.

The image sensor 10 includes a camera section and a detection section. The camera section repeatedly (e.g., at a cycle of 1/30 seconds) captures an image of a road surface or the like ahead of the vehicle, and sequentially outputs the captured images to the detection section.

The detection section sequentially executes a well-known image recognition process with respect to the captured image outputted from the camera section. Based on the position and luminance of a light source (taillight or headlight of a vehicle) shown in the captured image, the detection section specifies the positions, types, and distances from the own vehicle of one or more targets. Targets to be detected are vehicles in the captured image. The targets include preceding vehicles traveling in the same direction as the own vehicle, or oncoming vehicles traveling in a direction opposite to the own vehicle.

A target position is represented by a left coordinate that is a position coordinate of a lighting device (light source that is a taillight or a headlight) on the left side of the target as viewed from the camera, and a right coordinate that is a position coordinate of a lighting device (light source that is a taillight or a headlight) on the right side of the target as viewed from the camera. The left coordinate or the right coordinate is a position coordinate with reference to the position of the camera.

The distance to a target from the own vehicle includes a right distance that is a distance from the own vehicle to the lighting device on the right side of the target or a left distance that is a distance from the own vehicle to the lighting device on the left side of the target. The detection section sequentially outputs information on the positions, types, and distances from the own vehicle, as image sensor information of the identified plurality of targets, to the lamp ECU 11.

The lamp ECU 11 (corresponding to an example of the time period determining section) is a device for performing various controls on the basis of the image sensor information outputted from the image sensor 10 and various pieces of information received from an in-vehicle LAN. Specifically, the lamp ECU 11 controls turning on and off of the LEDs 12L, 12R, 13L and 13R and controls the leveling motors 14L and 14R. The lamp ECU 11 outputs a command to the left driver 15L and the right driver 15R. The lamp ECU 11 includes a CPU, a RAM, a ROM, and the like. The CPU executes a program recorded on the ROM, and when the program is executed, the RAM is used as a workspace.

The left Lo-LED 12L (corresponding to an example of the light source) is a light emitting diode emitting a low beam to an area ahead of the vehicle. Hereinafter, the light emitting diode is referred to as LED. The right Lo-LED 12R (corresponding to an example of the light source) is an LED emitting a low beam to the area ahead of the vehicle. The left Hi-LED 13L (corresponding to an example of the light source) is an LED emitting a high beam to the area ahead of the vehicle. The right Hi-LED 13R (corresponding to an example of the light source) is an LED emitting a high beam to the area ahead of the vehicle. The LEDs 12L, 12R, 13L and 13R each have an optical axis that can be changed only in the vertical direction of the vehicle.

The left leveling motor 14L is an actuator changing the optical axes of the LEDs 12L and 13L, and the LEDs of the left LED array unit 16L in the vertical direction of the vehicle. The right leveling motor 14R is an actuator changing the optical axes of the LEDs 12R and 13R, and the LEDs of the right LED array unit 16R in the vertical direction of the vehicle.

The left driver 15L (corresponding to an example of the luminance changing section) is an electronic circuit controlling, for example, turning on and off of the left LED array unit 16L on the basis of a command outputted from the lamp ECU 11. The lamp ECU 11 includes a CPU, a RAM, a ROM, and the like. The CPU executes the program recorded in the ROM, and when the program is executed, the RAM is used as a workspace.

The right driver 15R (corresponding to an example of the luminance changing section) is an electronic circuit controlling, for example, turning on and off of the right LED array unit 16R on the basis of a command outputted from the lamp ECU 11. The lamp ECU 11 includes a CPU, a RAM, a ROM, and the like. The CPU executes the program recorded in the ROM, and when the program is executed, the RAM is used as a workspace.

Figure 2:
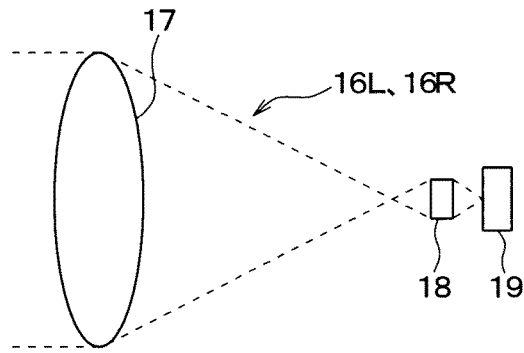
FIG. 2 is a schematic diagram illustrating an LED array unit 16L or 16R.

The left LED array unit 16L has a configuration equivalent to that of the right LED array unit 16R. As illustrated in FIG. 2, the LED array unit 16L or 16R has a projection lens 17, a light guide lens group 18, and an LED array 19.

The projection lens 17 is a convex lens located closer to the front of the vehicle than the light guide lens group 18 and having a focal point located closer to the projection lens 17 than to the light guide lens group 18. The light guide lens group 18 includes a plurality of (specifically, 11) light guide lenses aligned at regular intervals in the lateral direction of the vehicle.

Figure 3:
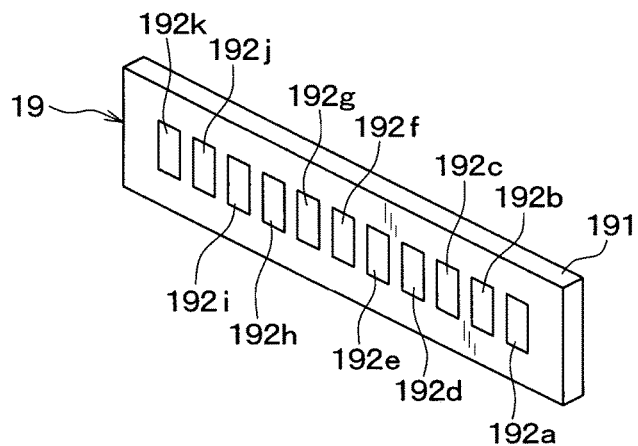
FIG. 3 is a schematic diagram illustrating an LED array 19.

As illustrated in FIG. 3, the LED array 19 includes a substrate 191 in a rectangular shape extending in the lateral direction of the vehicle, and a plurality of LEDs 192a to 192k arranged on the light guide lens group 18 side of the substrate. The number of the LEDs 192a to 192k is the same as the number of the light guide lenses of the light guide lens group 18. The LEDs 192a to 192k are aligned at regular intervals in the lateral direction of the vehicle. The left driver 15L controls turning on and off of the LEDs 192a to 192k of the left LED array unit 16L, and the right driver 15R controls turning on and off of the LEDs 192a to 192k of the right LED array unit 16R.

Each of the LEDs 192a to 192k of the left LED array unit 16L or each of the LEDs 192a to 192k of the right LED array unit 16R corresponds to an example of the single light source.

The LEDs 192a to 192k correspond, on a one-to-one basis, to the light guide lenses of the light guide lens group 18. Light emitted from any one of the LEDs 192a to 192k is magnified through the corresponding one of the light guide lenses and the projection lens 17, and radiated to the area ahead of the vehicle.

Variations in light distribution of the left lighting device will be described below. The light distribution realized by the left lighting device includes Lo mode light distribution, Hi mode light distribution, and S-Hi mode light distribution.

Figure 4:
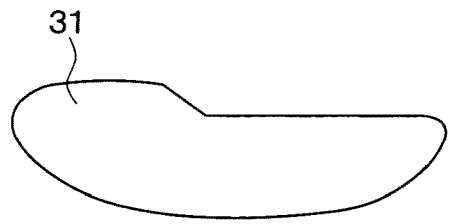
FIG. 4 is a diagram illustrating light distribution of a left lighting device in a Lo mode.

In the Lo mode, the left Lo-LED 12L is turned on, the left Hi-LED 13L is turned off, and the LEDs 192a to 192k of the left LED array unit 16L are all turned off. Consequently, when viewed from the left LED array unit 16L, the range over which the road surface ahead of the vehicle is illuminated by the left lighting device is formed of a range 31 as shown in FIG. 4. The range 31 is illuminated by the left Lo-LED 12L.

Thus, the Lo mode corresponds to a beam mode that maximizes the antiglare effect for a forward vehicle by reducing the range illuminated by the vehicle headlight.

Figure 5:
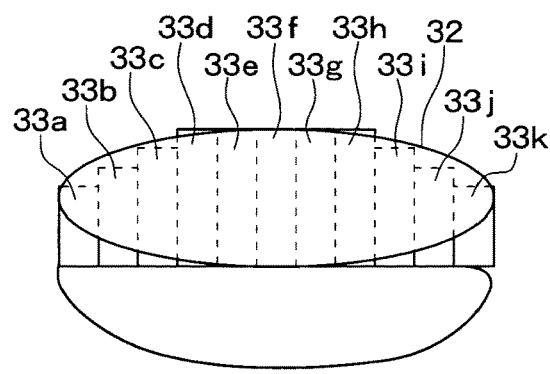
FIG. 5 is a diagram illustrating light distribution of the left lighting device in a Hi mode.

In the Hi mode, the left Lo-LED 12L is turned on, the left Hi-LED 13L is turned on, and the LEDs 192a to 192k of the left LED array unit 16L are all turned on. Consequently, as illustrated in FIG. 5, when viewed from the left LED array unit 16L, the illumination range over which the road surface ahead of the vehicle is illuminated by the left lighting device is formed of the range 31, a range 32, and ranges 33a to 33k which are overlapped with each other. The range 32 is illuminated by the left Hi-LED 13L. The ranges 33a to 33k are illuminated by the respective LEDs 192a to 192k of the left LED array unit 16L.

Thus, the Hi mode corresponds to a beam mode that maximizes the range illuminated by the vehicle headlight.

Figure 6:
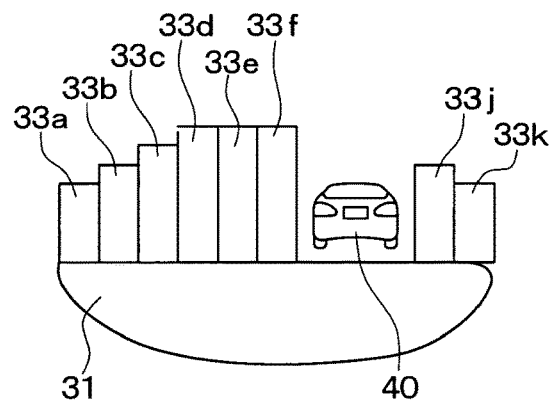
FIG. 6 is a diagram illustrating light distribution of the left lighting device in an S-Hi mode.

In the S-Hi mode, the left Lo-LED 12L is turned on, the left Hi-LED 13L is turned off, and among the LEDs 192a to 192k of the left LED array unit 16L, a part of the LEDs is turned on and all the rest is turned off. Consequently, when viewed from the left LED array unit 16L, the illumination range over which the road surface ahead of the vehicle is illuminated by the left lighting device is as shown in FIG. 6.

Specifically, the illumination range is made up of the range 31, the range 32, and only parts of the ranges 33a to 33k overlapping with each other. According to the example shown in FIG. 6, among the LEDs 192a to 192k of the left LED array unit 16L, the LEDs 192a to 192f, 192j, and 192k are turned on and the LEDs 192g, 192h, and 192i are turned off so that a forward vehicle 40 will not be illuminated. Consequently, among the ranges 33a to 33k, the ranges 33a to 33f, 33j, and 33k are illuminated, and the ranges 33g, 33h, and 33i are not illuminated. Thus, antiglare effect is exerted for the forward vehicle 40.

In the S-Hi mode, among the LEDs 192a to 192k, the combination of a part of the LEDs that is turned on and the rest of the LEDs that is not turned on changes, according to the position of the forward vehicle 40. This causes change in the region illuminated by the LEDs 192a to 192k and the light shielding region not illuminated by the LEDs 192a to 192k, ahead of the vehicle.

Thus, the S-Hi mode corresponds to a beam mode that makes the range illuminated by the vehicle headlight larger than the range illuminated by the vehicle headlight in the Lo mode, and can minimize deterioration in the antiglare effect for the forward vehicle.

According to light distribution variations of the right lighting device, illumination ranges over which the road surface ahead of the vehicle is illuminated by the right lighting device in the Lo mode, the Hi mode, and the S-Hi mode are bilaterally symmetrical with the ranges illustrated in FIGS. 4, 5, and 6, respectively. Description on the light distribution of the right lighting device will be available by replacing the left Lo-LED 12L, the left Hi-LED 13L, and the left LED array unit 16L, with the right Lo-LED 12R, the right Hi-LED 13R, and the right LED array unit 16R, respectively, in the above description of the Lo mode, the Hi mode, and the S-Hi mode of the left lighting device.

Figure 7:
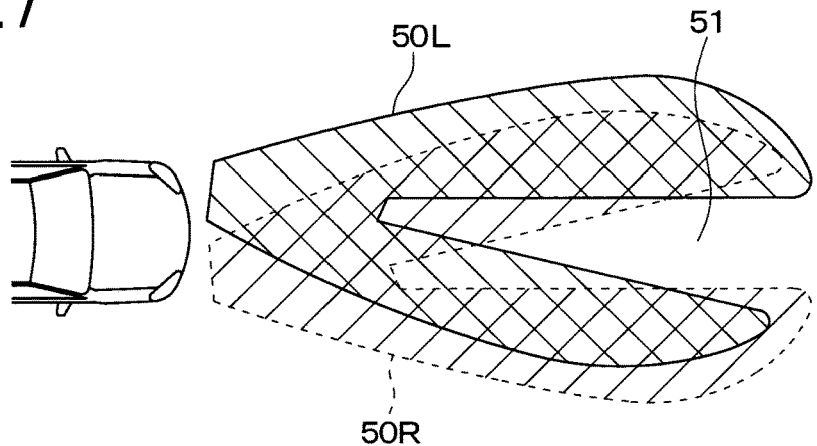
FIG. 7 is a diagram illustrating examples of light distribution of left and right lighting devices.

For example, as illustrated in FIG. 7, in the S-Hi mode, illumination ranges 50L and 50R illuminated by the respective left and right lighting devices are arranged so as to sandwich a light shielding region 51 therebetween and be partially overlapped with each other when viewed from above the vehicle.

The Lo mode achieves a Lo beam state where a plurality of light sources forming a high beam are all turned off. The Hi mode achieves a Hi beam state where the plurality of light sources forming a high beam are all turned on. The S-Hi mode achieves a light shielding Hi beam state where a part of the plurality of light sources forming a high beam is turned on and the rest is turned off. According to the present embodiment, the plurality of light sources forming a high beam include the left Hi-LED 13L, the right Hi-LED 13R, the LEDs 192a to 192k of the left LED array unit 16L, and the LEDs 192a to 192k of the right LED array unit 16R.

The following description will specifically discuss how the vehicle headlight control system is activated. First, in the lamp ECU 11, the CPU reads the program from the ROM for execution, so that a main process shown in FIG. 8 is cyclically executed (e.g., at a cycle of 50 milliseconds).

Figure 10:
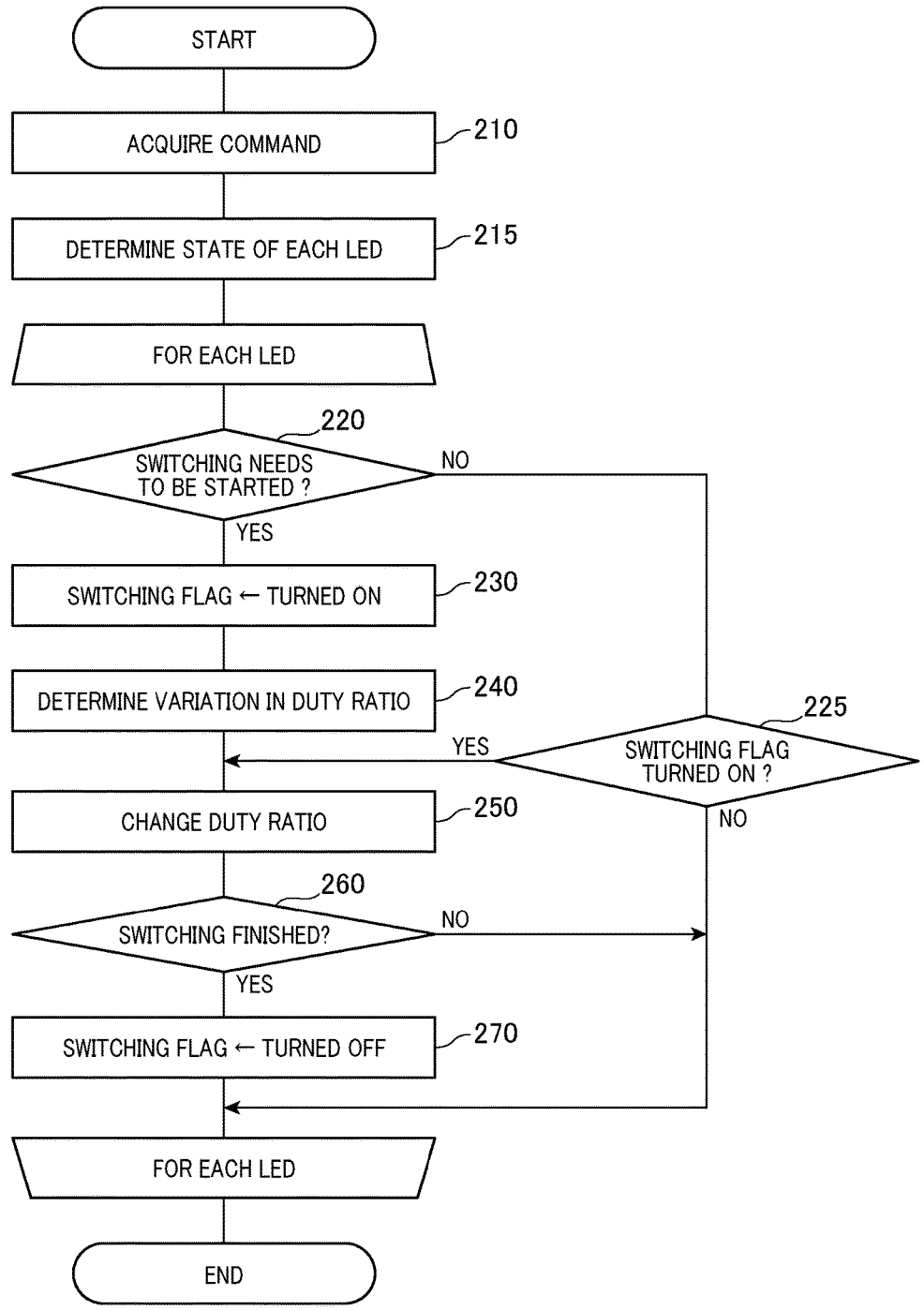
FIG. 10 is a flow diagram illustrating a process performed by the driver.

In the left driver 15L or the right driver 15R, the CPU reads a program from the ROM for execution, so that a process shown in FIG. 10 is cyclically executed. The cycle of the process shown in FIG. 10 can be the same as or different from the cycle of the process shown in FIG. 8.

In the following description, the process executed by the CPU of the lamp ECU 11 is described as a process executed by the lamp ECU 11. The process executed by the CPU of the driver 15L or 15R is described as a process executed by the driver having the CPU.

Figure 8:
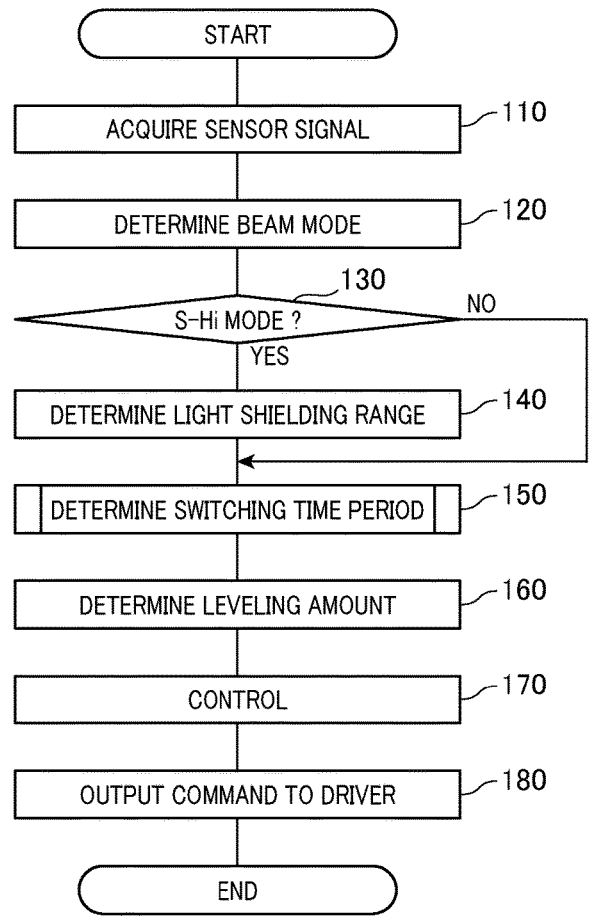
FIG. 8 is a flow diagram illustrating a main process executed by a lamp ECU.

According to the process shown in FIG. 8, the lamp ECU 11 first acquires a sensor signal or the like at step 110. Specifically, the lamp ECU 11 acquires image sensor information outputted from the image sensor 10 and also acquires information from various sensors via the in-vehicle LAN.

Examples of the information acquired via the in-vehicle LAN are as follows:

(1) Beam mode setting which the user in the vehicle has made with respect to the operation section (e.g., mechanical switch) in the vehicle;

(2) Vehicle speed of the own vehicle;

(3) Current time;

(4) Current traveling area of the own vehicle; and (5) Current weather at the current location of the own vehicle.

The information (1) is outputted from the operation section to the in-vehicle LAN. With regard to the information (2), a value based on a vehicle speed pulse signal is outputted to the in-vehicle LAN from an ECU (e.g., body ECU) acquiring the vehicle speed pulse signal from a vehicle speed sensor that is installed in the own vehicle. The information (3) is outputted to the in-vehicle LAN from an ECU (e.g., body ECU) measuring a current time.

The information (4) is outputted to the in-vehicle LAN from the road-map-data-readable navigation ECU that acquires current location information from the GPS receiver installed in the own vehicle. Specifically, based on current location coordinates of the own vehicle acquired from the GPS receiver, the navigation ECU specifies the type of area to which the current location coordinates belong from the road map data. The navigation ECU then outputs the specified type of area to the in-vehicle LAN as information on the current traveling area of the own vehicle. The type of area indicates whether the area is an urban area or not. For each position coordinate, information on whether the position coordinate is included in the urban area is recorded in advance in the road map data.

The information (5) is transmitted to the in-vehicle LAN from an ECU that acquires information on weather at the location of the own vehicle from outside the vehicle (e.g., weather information server on the Internet) using a wireless communication device installed in the own vehicle.

Subsequently, a beam mode is determined at step 120. Specifically, when one or more of the following conditions (L1), (L2) and (L3) are satisfied, the beam mode is switched to the Lo mode and the manual flag in the RAM is turned off:

(L1) The vehicle speed of the own vehicle acquired at step 110 is not more than a reference speed (e.g., 20 km per hour);

(L2) The current time acquired at step 110 is in a time period corresponding to daytime (e.g., after 9 a.m. and before 4 p.m.); and (L3) The current traveling area of the own vehicle acquired at step 110 is the urban area.

If none of the above conditions (L1), (L2) and (L3) is satisfied but the following condition (H1) is satisfied, the beam mode is switched, at step 120, to the Hi mode and the manual flag in the RAM is turned off:

(H1) The image sensor information acquired at step 110 indicates that no target is present in the captured image.

If none of the above conditions (L1), (L2), (L3) and (H1) is satisfied, the beam mode is switched, at step 120, to the S-Hi mode and the manual flag in the RAM is turned off. When none of the above conditions (L1), (L2), (L3) and (H1) is satisfied, it means that the image sensor information acquired at step 110 indicates the presence of one or more targets in the captured image.

However, at step 120, regardless of the foregoing beam mode selecting conditions, if the beam mode settings acquired at step 110 correspond to an instruction for switching the beam mode to the Lo mode, the Hi mode or the S-Hi mode, the beam mode is switched to the instructed mode, and the manual flag in the RAM is turned on.

Subsequently, at step 130, it is determined whether the mode set at step 120 is the S-Hi mode. If the set mode is the S-Hi mode, control proceeds to step 140. If the set mode is not the S-Hi mode, control bypasses step 140 and proceeds to step 150.

At step 140, light shielding ranges of the left and right lighting devices in the S-Hi mode are determined on the basis of the image sensor information acquired at step 110. The description below will discuss the case where the image sensor information acquired at step 110 includes only a left coordinate and a right coordinate of a single target as position coordinates of the target, that is, the case where only one forward vehicle is present in the captured image. In such a case, the left coordinate corresponds to the position coordinate of an illumination at the left end of the forward vehicle with reference to the camera of the image sensor 10 as viewed from the camera. The right coordinate corresponds to the position coordinate of an illumination at the right end of the forward vehicle with reference to the camera of the image sensor 10 as viewed from the camera.

At step 140, a horizontal in-plane angle $\theta_{LL}$ of the left illumination and a horizontal in-plane angle $\theta_{LR}$ of the right illumination of the forward vehicle with reference to the left lighting device of the own vehicle as viewed from the left lighting device are determined based on the left and right coordinates. In addition, a horizontal in-plane angle $\theta_{RL}$ of the left illumination and a horizontal in-plane angle $\theta_{RR}$ of the right illumination of the forward vehicle with reference to the right lighting device of the own vehicle as viewed from the right lighting device are determined based on the left and right coordinates.

The horizontal in-plane angle herein refers to an angle of an in-plane perpendicular to the vertical direction of the vehicle, with the forward direction of the vehicle being zero degrees. The horizontal in-plane angles $\theta_{LL}$, $\theta_{LR}$, $\theta_{RL}$ and $\theta_{RR}$ can be specified on the basis of the positions of the camera, the positions of the left and right lighting devices, a predetermined margin width, and the like which are recorded in advance in the ROM of the lamp ECU 11.

Figure 9:
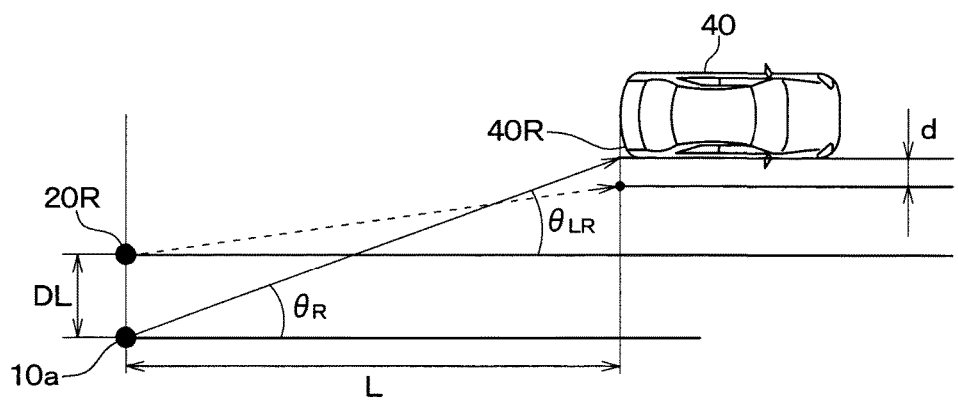
FIG. 9 is a diagram illustrating parameters determining a light shielding range.

For example, as illustrated in FIG. 9, when OR indicates a horizontal in-plane angle of a right illumination 40R of the forward vehicle 40 with reference to a camera 10a as viewed from the camera 10a, L indicates a position difference between the own vehicle and the forward vehicle 40 in a forward direction of the vehicle, and d indicates the predetermined margin width, a relation $\theta_{LR}=\arctan\{(L\times\tan\theta_R-d-D)/L\}$ is established. The horizontal in-plane angle $\theta_R$ is calculated from the right coordinate mentioned above. The position difference L (i.e., distance between the vehicles) is calculated from the right distance included in the image sensor information acquired at step 110 and the aforementioned horizontal in-plane angle $\theta_R$.

The angle range from the horizontal in-plane angles $\theta_{LL}$ to $\theta_{LR}$ is the light shielding range of the left lighting device, and the angle range from the horizontal in-plane angles $\theta_{RL}$ to $\theta_{RR}$ is the light shielding range of the right lighting device. While the main process is repeatedly executed, the lamp ECU 11 frequently changes the horizontal in-plane angles $\theta_{LL}$, $\theta_{LR}$, $\theta_{RL}$ and $\theta_{RR}$ according to the change in position and attitude of the own vehicle and the change in position and attitude of the forward vehicle. Subsequent to step 140, control proceeds to step 150.

Figure 11:
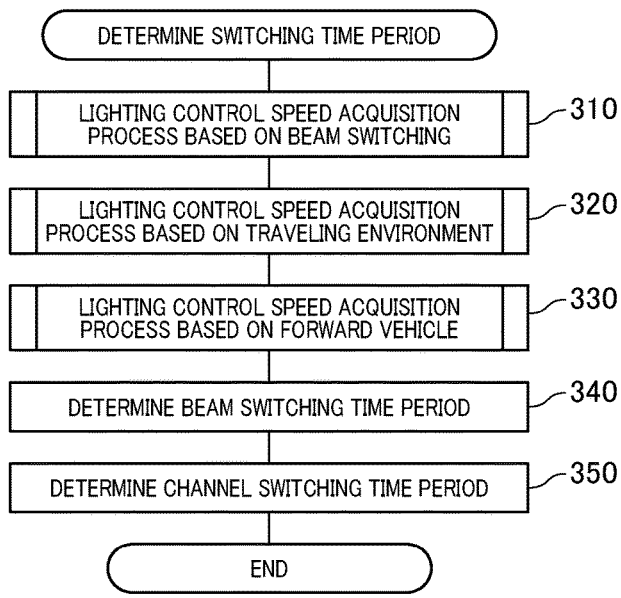
FIG. 11 is a flow diagram illustrating a switching time period determination process.

At step 150, a switching time period determination process is executed. As shown in FIG. 11, in the switching time period determination process, a lighting control speed acquisition process is executed first at step 310 on the basis of beam switching.

Figure 12:
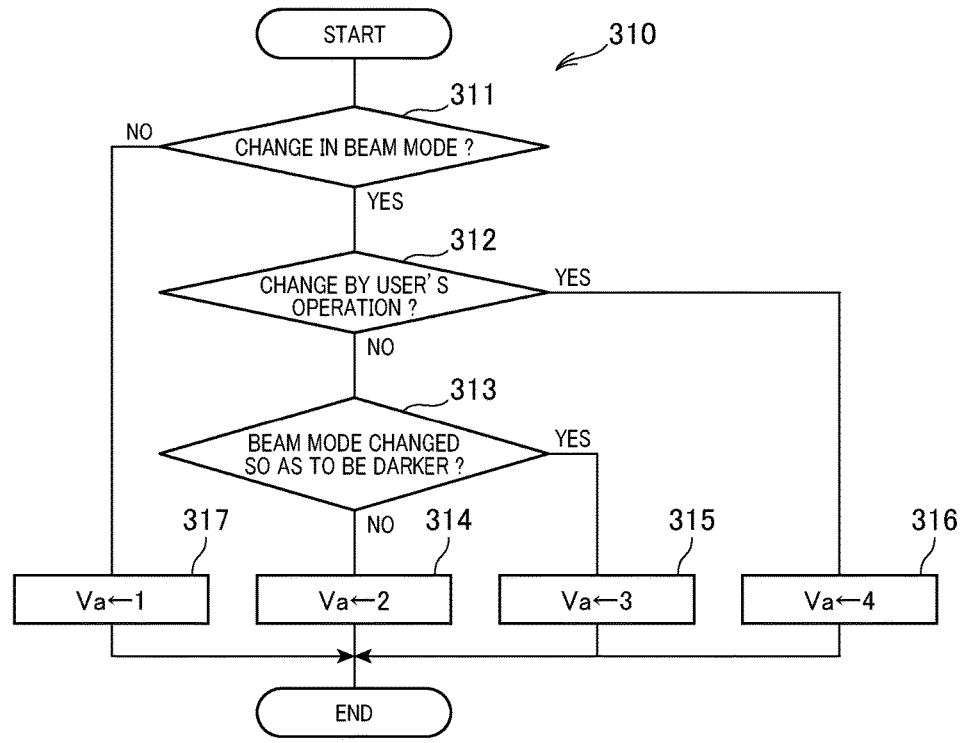
FIG. 12 is a flow diagram illustrating a lighting control speed acquisition process based on beam switching.

As shown in FIG. 12, in the process of step 310, it is determined first at step 311 whether there is a change in beam mode during the beam mode determination process of the preceding step 120. If it is determined that there is a change in beam mode, control proceeds to step 312. If it is determined that there is no change in beam mode, control proceeds to step 317.

At step 317, a variable Va is set to 1, and then control proceeds to step 320. As the variable Va has a larger value, the lighting control speed for the LEDs 192a to 192k is increased more. The lighting control speed refers to a speed at which the luminance of a target LED is varied.

At step 312, it is determined whether the beam mode change at the preceding step 120 has been caused by the user's mode switching operation. Specifically, if the manual flag in the RAM is on, it is determined that the change has been caused by the user's mode switching operation, and control proceeds to step 316. If the manual flag in the RAM is off, it is determined that the change has not been caused by the user's mode switching operation, that is, the beam mode change has been caused by a factor other than the user's mode switching operation, and control proceeds to step 313.

At step 316, the variable Va is set to 4, and then control proceeds to step 320. At step 313, it is determined whether the beam mode has changed at the preceding step 120 so as to be darker, that is, whether the beam mode has changed so as to reduce the number of LEDs that are turned among the LEDs 192a to 192k of the LED array unit 16L or 16R.

When there is a change from the Hi mode to the S-Hi mode, or when there is a change from the Hi mode to the Lo mode, or when there is a change from the S-Hi mode to the Lo mode, it is determined that there has been a beam mode change so as to be darker, and control proceeds to step 315.

When there is a change from the Lo mode to the S-Hi mode, or when there is a change from the Lo mode to the Hi mode, or when there is a change from the S-Hi mode to the Hi mode, it is determined that there has not been a beam mode change so as to be darker, and control proceeds to step 314. When there has not been a beam mode change so as to be darker, it means that the beam mode has been changed so as to increase the number of LEDs which are turned on among the LEDs 192a to 192k of the LED array unit 16L or 16R.

At step 315, the variable Va is set to 3, and then control proceeds to step 320. At step 314, the variable Va is set to 2, and then control proceeds to the step 320.

Thus, at step 310, when the beam mode change has been caused by the user's operation, the lamp ECU 11 causes the lighting control speed of the LED to be higher than when the beam mode change has been caused by a factor other than the user's operation (see step 312). This is because when the user consciously changes the beam mode, it is highly likely that the user is in a hurry to turn on or off the LED.

At step 310, when the beam mode has been changed so as to be darker, the lamp ECU 11 causes the lighting control speed of the LED to be higher than when the beam mode has been changed so as to be brighter (see step 313). This is because, while it is desirable to relatively promptly turn off the LED to exert the antiglare effect for the forward vehicle, it is desirable to relatively slowly turn on the LED so that the user (i.e., the driver of the own vehicle) feels less uneasy.

At step 320 (see FIG. 11), a lighting control speed acquisition process suitable for the traveling environment is executed. According to the process at step 320, as shown in FIG. 13, it is determined first, at step 321, whether the vehicle speed of the own vehicle acquired at step 110 exceeds a reference speed (specifically, 80 km per hour). If the vehicle speed exceeds the reference speed, control proceeds to step 329, and if not, control proceeds to step 323. In this case, a speed higher than the reference speed is an example of the second speed, and a speed not more than the reference speed is an example of the first speed.

At step 329, a variable Vb is set to 4, and then control proceeds to step 330. As the variable Vb has a larger value, the lighting control speed for the LEDs 192*a* to 192*k* is increased more.

At step 323, it is determined whether the current traveling area of the own vehicle acquired at step 110 is an urban area. If it is determined that the current traveling area of the own vehicle is an urban area, control proceeds to step 325, and if not, control proceeds to step 324.

At step 324, based on the current time and the current weather in the current location which have been acquired at step 110, it is determined whether the surroundings of the own vehicle are bright. The current time and the current weather in the current location are both examples of the information related to the ambient brightness of the vehicle. Specifically, in the case where the current time falls in a daytime period (e.g., after 9 a.m. and before 4 p.m.) and the current weather in the current location is sunny or cloudy, the lamp ECU 11 determines that the surroundings of the own vehicle are bright, and control proceeds to the step 325.

Specifically, if the current time does not fall in a daytime period or the current weather in the current location is rainy, the lamp ECU 11 determines that the surroundings of the own vehicle are not bright, and control proceeds to step 327. At step 325, the variable Vb is set to 2, and then control proceeds to the step 330. At step 327, the variable Vb is set to 3, and then control proceeds to the step 330.

Thus, at step 320, in the case where the vehicle speed of the own vehicle exceeds the reference speed, the lamp ECU 11 causes the lighting control speed for the LED to be higher than in the otherwise case (see the step 321). This is because when the own vehicle is traveling at high speed, the situation around the own vehicle rapidly changes and thus quick turning on or off of the LED is desired.

At step 320, in the case where the own vehicle is traveling in the urban area, the lamp ECU 11 causes the lighting control speed to be lower than in the otherwise case. This is because the situation around the own vehicle does not rapidly change as compared with the case where the own vehicle is traveling at high speed.

At step 320, in the case where surroundings of the own vehicle are bright, the lamp ECU 11 causes the lighting control speed to be lower than would otherwise be the case. This is because particularly when the LED changes from an off state to an on state when it is dark around the own vehicle, the LED should be more quickly turned on so that visibility is ensured.

At step 330 (see FIG. 11), a lighting control speed acquisition process suitable for a forward vehicle is executed. According to the process at step 330, as shown in FIG. 14, it is determined first, at step 331, whether a forward vehicle has appeared or not, on the basis of the latest image sensor information acquired at preceding step 110 and the image sensor information acquired at step 110 of the previous cycle.

Specifically, when the image sensor information of the previous cycle indicates the presence of no target in the captured image, and the latest image sensor information includes information on the position and type of a target, it is determined that a forward vehicle has appeared. When the latest image sensor information indicates the presence of no target in the captured image, and the image sensor information of the previous cycle includes information on the position and type of a target, it is determined that a forward vehicle has disappeared. Otherwise, it is determined that a forward vehicle has neither appeared nor disappeared.

Subsequently, if it is determined, at step 331, that the forward vehicle has appeared or disappeared, the type of the forward vehicle is determined at step 332.

Specifically, if it is determined, at step 331, that a forward vehicle has appeared and the type of the target in the latest image sensor information is a preceding vehicle, it is determined that the forward vehicle that has appeared is a preceding vehicle. If it is determined, at step 331, that a forward vehicle has appeared and the type of the target in the latest image sensor information is an oncoming vehicle, it is determined that the forward vehicle that has appeared is an oncoming vehicle.

If it is determined, at step 331, that the forward vehicle has disappeared and the type of the target in the image sensor information of the previous cycle is a preceding vehicle, it is determined that the forward vehicle that has disappeared is a preceding vehicle. If it is determined, at step 331, that the forward vehicle has disappeared and the type of the target in the image sensor information of the previous cycle is an oncoming vehicle, it is determined that the forward vehicle that has disappeared is an oncoming vehicle.

Subsequently, at step 333, a lighting control speed Vc is determined from the results of the determinations at steps 331 and 332. As the variable Vc has a larger value, the lighting control speed for the LEDs 192*a* to 192*k* is increased more.

Specifically, at step 333, the lighting control speed Vc is determined by applying the results of the determinations at steps 331 and 332 to a lighting control speed selection table recorded in advance in the ROM of the lamp ECU 11. The lighting control speed selection table includes the contents as shown in FIG. 15.

Accordingly, if a forward vehicle has appeared, the lamp ECU 11 sets the variable Vc to a value 3 regardless of whether the forward vehicle that has appeared is a preceding vehicle or an oncoming vehicle. If the forward vehicle has disappeared and the disappeared forward vehicle is a preceding vehicle, the lamp ECU 11 sets the variable Vc to a value 2. If the disappeared forward vehicle is an oncoming vehicle, the lamp ECU 11 sets the variable Vc to a value 4. If no forward vehicle has appeared or disappeared, the lamp ECU 11 sets the variable Vc to a value 1.

Thus, in the case where the forward vehicle has disappeared, the lamp ECU 11 sets the lighting control speed to a higher value when the disappeared forward vehicle is an oncoming vehicle than when the disappeared forward vehicle is a preceding vehicle.

The reasons for these operations are as follows. First, let us discuss the case where the conditions (L1), (L2) and (L3) are not satisfied in a given time period, and a single forward vehicle (target) is present in a captured image. During the given time period, the lamp ECU 11 sets the beam mode to the S-Hi mode at step 120 of every cycle of the main process of FIG. 8, based on the fact that none of the conditions (L1), (L2), (L3) and (H1) is satisfied.

Then, assume that the forward vehicle disappears from the captured image at a time point immediately after the given time period. Thus, at this time point, since none of the conditions (L1), (L2) and (L3) is satisfied but the condition (H1) is satisfied, the lamp ECU 11 switches the beam mode from the S-Hi mode to the Hi mode at step 120 of the main process.

Accordingly, at that time point, the lamp ECU 11 determines at step 331 of FIG. 14 that the forward vehicle has disappeared. Then, at the subsequent step 333, if the disappeared forward vehicle is a preceding vehicle, the lamp ECU 11 sets the variable Vc to a value 2 and if the disappeared forward vehicle is an oncoming vehicle, the lamp ECU 11 sets the variable Vc to a value 4.

In the case where the oncoming vehicle disappears from the captured image, it means that the oncoming vehicle certainly has disappeared from ahead of the own vehicle or is expected to disappear from ahead of the own vehicle immediately afterwards. Thus, even if the LED is quickly turned on when the beam mode switches from the S-Hi mode to the Hi mode, the driver of the oncoming vehicle is relatively less likely to be dazzled. Furthermore, the speed of the oncoming vehicle relative to the own vehicle tends to be higher than the speed of the preceding vehicle relative to the own vehicle.

In the case where a preceding vehicle disappears from the captured image, it is highly likely that the disappearance merely means that the preceding vehicle has moved away from the own vehicle so that the image sensor 10 cannot recognize the preceding vehicle, and the preceding vehicle has not actually disappeared from ahead of the own vehicle. Thus, if the LED is quickly turned on in such a case, it is relatively highly likely to dazzle the driver of the preceding vehicle. Furthermore, the speed of the preceding vehicle relative to the own vehicle tends to be lower than the speed of the oncoming vehicle relative to the own vehicle.

Simply stated, the preceding vehicle slowly disappears from ahead of the own vehicle and the oncoming vehicle suddenly disappears from ahead of the own vehicle. For this reason, in the case of the forward vehicle disappearing, the lamp ECU 11 increases the lighting control speed (in this case, the switching speed of the LED from off to on) more when the disappeared forward vehicle is an oncoming vehicle than when it is a preceding vehicle.

The lamp ECU 11 increases the lighting control speed more when a preceding vehicle has appeared than when disappeared. This is to prevent the preceding vehicle from being illuminated with the light of the own vehicle, by more quickly turning off the LED when the preceding vehicle has appeared. The lamp ECU 11 decreases the lighting control speed more when an oncoming vehicle has appeared than when disappeared. This is to ensure visibility of the own vehicle's driver with quicker turning on of the LED, because no vehicle is present ahead of the own vehicle when the oncoming vehicle has disappeared.

Subsequent to step 333, control proceeds to step 340 (see FIG. 11) and a beam switching time period is determined. The beam switching time period corresponds to the time taken for the LEDs 192*a* to 192*k* to gradually change between on and off states with the change of beam mode, that is, the time taken for them to switch from an on state to an off state, or vice versa.

The beam switching time period is determined as follows. First, a product V1=Va×Vb×Vc is calculated for the values of the lighting control speeds Va, Vb and Vc determined at respective steps 310, 320 and 330. Then, three-stage beam switching time period is determined based on the calculated value V1. Specifically, when the value V1 is less than 10, the beam switching time period is determined to be a maximum value TBL (e.g., 1000 milliseconds). When the value V1 is 10 or more and less than 20, the beam switching time period is determined to be an intermediate value TBM (e.g., 500 milliseconds). When the value V1 is 20 or more, the beam switching time period is determined to be a minimum value TBS (e.g., 200 milliseconds). That is, as the lighting control speeds Va, Vb and Vc are higher, the beam switching time period becomes shorter.

Subsequently, control proceeds to step 340 (see FIG. 11) and a beam switching time period is determined. The beam switching time period corresponds to the time taken for the LEDs 192*a* to 192*k* to gradual change between on and off states with the change of beam mode, that is, the time taken for them to switch from an on state to an off state, or vice versa.

The beam switching time period is determined as follows. First, a product V1=Va×Vb×Vc is calculated as a monotonic increasing function for the values of the lighting control speeds Va, Vb and Vc determined at respective steps 310, 320 and 330. Then, three-stage beam switching time period is determined based on the calculated value V1. Specifically, when the value V1 is less than 10, the beam switching time period is determined to be a maximum value TBL (e.g., 1000 milliseconds). When the value V1 is 10 or more and less than 20, the beam switching time period is determined to be an intermediate value TBM (e.g., 500 milliseconds). When the value V1 is 20 or more, the beam switching time period is determined to be a minimum value TBS (e.g., 200 milliseconds). That is, as the lighting control speeds Va, Vb and Vc are higher, the beam switching time period becomes shorter.

Subsequently, at step 350, a channel switching time period is determined. The channel switching time period corresponds to the time taken for the LEDs 192*a* to 192*k* in the S-Hi mode to gradually change between on and off states, that is, the time taken for them to switch from an on state to an off state, or vice versa.

The channel switching time period is determined as follows. First, a product V2=Va×Vb×Vc is calculated as a monotonic increasing function for the values of the lighting control speeds Va, Vb and Vc determined at respective steps 310, 320 and 330. Then, three-stage beam switching time period is determined based on the calculated value V2. Specifically, when the value V2 is less than 10, the beam switching time period is determined to be a maximum value TCL (e.g., 1000 milliseconds). When the value V2 is 10 or more and less than 20, the beam switching time period is determined to be an intermediate value TCM (e.g., 500 milliseconds). When the value V2 is 20 or more, the beam switching time period is determined to be a minimum value TCS (e.g., 200 milliseconds). That is, as the lighting control speeds Va, Vb and Vc are higher, the channel switching time period becomes shorter.

The beam switching time period may be equal to the channel switching time period, or the beam switching time period may be longer than the channel switching time period, or the beam switching time period may be shorter than the channel switching time period. After step 350, step 150 in the main process of FIG. 8 ends, and then control proceeds to step 160.

At step 160, a leveling amount is determined. The leveling amount is an angle of the optical axis of each of the LEDs 12L, 12R, 13L and 13R, the LEDs 192*a* to 192*k* of the left LED array unit 16L, and the LEDs 192*a* to 192*k* of the right LED array unit 16R, with respect to the surface perpendicular to the vertical direction of the vehicle.

This angle can be determined, for example, based on the position coordinates of the target included in the image sensor information acquired at step 110, or may be determined based on an angle of inclination in the longitudinal direction of the road the vehicle is traveling. When the information on the angle of inclination of the road in the longitudinal direction is used, the lamp ECU 11 can acquire information on the vehicle body acceleration together with the vehicle speed information from the in-vehicle LAN at step 110 to specify the direction of gravity on the basis of the information on the vehicle speed and the vehicle body acceleration, and then specify the angle of inclination of the road in the longitudinal direction on the basis of the specified direction of gravity.

Subsequently, at step 170, the LEDs 12L, 12R, 13L and 13R, the left leveling motor 14L, and the right leveling motor 14R are controlled on the basis of the beam mode determined at step 120 and the leveling amount determined at step 160.

Specifically, if the beam mode determined at preceding step 120 is the Hi mode, the left Lo-LED 12L and the right Lo-LED 12R are turned on, and the left Hi-LED 13L and the right Hi-LED 13R are turned on. If the beam mode determined at preceding step 120 is the Lo mode or the S-Hi mode, the left Lo-LED 12L and the right Lo-LED 12R are turned on, and the left Hi-LED 13L and the right Hi-LED 13R are turned off. Furthermore, the left leveling motor 14L and the right leveling motor 14R are controlled so that the leveling amount determined at preceding step 160 is achieved.

Subsequently, at step 180, a command is outputted to the left driver 15L and the right driver 15R. The command to be outputted includes the beam mode determined at preceding step 120 and the beam switching time period and the channel switching time period determined at step 150. However, only when the beam mode determined at preceding step 120 is the S-Hi mode, the light shielding range determined at step 140 is also included in the command. After finishing step 180, the current cycle of the main process is terminated.

In every cycle of the process shown in FIG. 10, the drivers 15L and 15R each firstly acquire, at step 210, the command outputted from the lamp ECU 11. Subsequently, at step 215, a target on/off state is determined for the LEDs 192a to 192k of each of the LED array units 16L and 16R on the basis of the command acquired at preceding step 210.

Specifically, if the beam mode in the acquired command is the Lo mode, the left driver 15L determines the target on/off state to be an "off state" for all the LEDs 192a to 192k of the left LED array unit 16L. If the beam mode in the acquired command is the Hi mode, the left driver 15L determines the target on/off state to be an "on state" for all the LEDs 192a to 192k of the left LED array unit 16L.

If the beam mode in the acquired command is the S-Hi mode, a target on/off state for the LEDs 192a to 192k of the left LED array unit 16L is determined on the basis of the light shielding range (i.e., range from $\theta_{LL}$ to $\theta_{LR}$) of the left lighting device in the command.

As data necessary for this process, the ROM of the left driver 15L stores in advance ranges $\phi L_1$ to $\phi L_{11}$ of horizontal in-plane angle of light to be emitted from the respective LEDs 192a to 192k of the left LED array unit 16L.

Note that $\phi Lj$ (j=1, 2, . . . 11) is an amount indicating a range (e.g., not less than 0° and not more than 11°) of a horizontal in-plane angle of light to be emitted from the jth LED from the left among the LEDs 192a to 192k of the left LED array unit 16L. For example, $\phi Lj$ is a range with an angular width of 11°.

For each of the LEDs 192a to 192k of the left LED array unit 16L, the left driver 15L reads from the ROM a range $\phi L_i$ (i is the corresponding numeral) of a horizontal in-plane angle of light to be emitted from the LED. The left driver 15L then determines whether at least a part of the read range $\phi L_i$ is included in the light shielding range of the left lighting device. If the determination is affirmative, the light on/off state of the LED in question is determined to be an "off state". If the determination is negative, the light on/off state of the LED in question is determined to be an "on state". That is, the target on/off state of each of the LEDs 192a to 192k is determined so that the light shielding range is not illuminated by the LED but other range is illuminated.

As already described, the light shielding range for the left lighting device frequently varies. Thus, in the process described above, the left driver 15L changes the combination of LEDs that are turned on and the rest of the LEDs that are not turned on, among the LEDs 192a to 192k of the left LED array unit 16L, according to the variation of the light shielding range. This consequently causes some LEDs to switch from an on state to an off state, and some LEDs to switch from an off state to an on state. Thus, the left driver 15L can vary the illumination region ahead of the own vehicle to be illuminated by the LEDs 192a to 192k and the light shielding region not to be illuminated by them.

If the beam mode in the acquired command is the Lo mode, the right driver 15R determines the target on/off state to be an "off state" for all the LEDs 192a to 192k of the right LED array unit 16R. If the beam mode in the acquired command is the Hi mode, the right driver 15R determines the target on/off state to be an "on state" for all the LEDs 192a to 192k of the right LED array unit 16R.

If the beam mode in the acquired command is the S-Hi mode, the right driver 15R determines the target on/off state for each of the LEDs 192a to 192k of the right LED array unit 16R on the basis of the light shielding range (i.e., range from $\theta_{RL}$ to $\theta_{RR}$) of the right lighting device in the command.

As data necessary for this process, the ROM of the right driver 15R stores in advance ranges $\phi R_1$ to $\phi R_{11}$ of horizontal in-plane angle of light to be emitted from the respective LEDs 192a to 192k of the right LED array unit 16R.

Note that $\phi Rj$ (j=1, 2, . . . 11) is an amount indicating a range (e.g., not less than 0° and not more than 11°) of a horizontal in-plane angle of light to be emitted from the jth LED from the left, among the LEDs 192a to 192k of the right LED array unit 16R. For example, $\phi Rj$ is a range with an angular width of 11°.

For each of the LEDs 192a to 192k of the right LED array unit 16R, the right driver 15R reads from the ROM a range $\phi R_i$ (i is the corresponding numeral) of a horizontal in-plane angle of light to be emitted from the LED. The right driver 15R then determines whether at least a part of the read range $\phi R_i$ is included in the light shielding range of the right lighting device. If the determination is affirmative, the light on/off state of the LED in question is determined to be an "off state". If the determination is negative, the light on/off state of the LED in question is determined to be an "on state". That is, the target on/off state of each of the LEDs 192a to 192k is determined so that the light shielding range is not illuminated by the LED but other range is illuminated.

As already described, the light shielding range for the right lighting device frequently varies. Thus, in the process described above, the right driver 15R changes the combination of LEDs that are turned on and the rest of the LEDs that are not turned on, among the LEDs 192a to 192k of the right LED array unit 16R, according to the variation of the light shielding range. This consequently causes some LEDs to switch from an on state to an off state, and some LEDs to switch from an off state to an on state. Thus, the right driver 15R can vary the illumination region ahead of the own vehicle illuminated by the LEDs 192a to 192k and the light shielding region not illuminated by them.

Subsequent to step 215, the drivers 15L and 15R each perform steps 220 to 270 once for each of the LEDs 192a to 192k. That is, the left driver 15L performs steps 220 to 270 once for the individual LEDs 192a to 192k of the left LED array unit 16L. The right driver 15R performs steps 220 to 270 once for each of the LEDs 192a to 192k of the right LED array unit 16R.

At steps 220 to 270 of each cycle, the drivers 15L and 15R first determine, at step 220, whether switching of on/off state needs to be started for a target LED. Specifically, if the target on/off state determined at preceding step 215 for the target LED in question has changed from the target on/off state determined for the target LED at step 215 of the previous cycle, the switching of the on/off state is determined to be necessary, and control proceeds to step 230. If not changed, the switching of the on/off state is determined not to be necessary, and control proceeds to step 225.

At step 230, a switching flag for the target LED is turned on. In the left driver 15L, a total of 11 switching flags are set in the RAM so that one switching flag is provided to each of the LEDs 192a to 192k of the left LED array unit 16L. Also, in the right driver 15R, a total of 11 switching flags are set in the RAM so that one switching flag is provided to each of the LEDs 192a to 192k of the right LED array unit 16R.

At step 240, a variation in duty ratio is determined for a target LED. The drivers 15L and 15R adjust a luminance of each LED by performing PWM control with respect to the electric current supplied to the LED. A variation in duty ratio used at the time of the PWM control is the variation determined as described above.

As the duty ratio for a target LED becomes greater, the luminance of the target LED becomes higher. When the duty ratio is a predetermined turn-off value DL (e.g., 0), the target LED is brought into a predetermined off state. When the duty ratio is in a predetermined turn-on value DH (e.g., 1), the target LED is brought into a predetermined on state.

The variation in duty ratio is determined on the basis of the beam switching time period or channel switching time period received in preceding step 210. Specifically, first, a code value is set to −1 when the target on/off state determined for the target LED at preceding step 215 is an "off state" and the target on/off state determined for the target LED at step 215 of the previous cycle is an "on state". The code value is set to 1 when the target on/off state determined for the target LED at preceding step 215 is an "on state" and the target on/off state determined for the target LED at step 215 of the previous cycle is an "off state".

Then, when the beam mode received at preceding step 210 differs from the beam mode received at step 210 of the previous cycle, the variation in duty ratio is determined as below. Based on a turn-on value DH and a turn-off value DL, a difference DH–DL is multiplied by a control period, and this product is then divided by the beam switching time period. This quotient is then multiplied by the aforementioned code value, and this product is determined as a variation in duty ratio for the target LED. The control period corresponds to the cycle period of the process shown in FIG. 10.

When the beam mode received at preceding step 210 and the beam mode received at step 210 of the previous cycle are both the S-Hi mode, the variation in duty ratio is determined as below. A difference DH–DL between the turn-on value DH and the turn-off value DL is multiplied by the control period, and this product is then divided by the channel switching time period. This quotient is then multiplied by the code value, and this product is determined as a variation in duty ratio for the target LED.

Thus, when an LED needs to be turned on due to the change in beam mode, the drivers 15L and 15R determine, at step 240, a positive value as a variation in duty ratio for the LED. The positive value has an absolute value that becomes smaller as the beam switching time period becomes longer. When an LED needs to be turned off due to the change in beam mode, the drivers 15L and 15R determine, at step 240, a negative value as a variation in duty ratio for the LED. The negative value has an absolute value that becomes smaller as the beam switching time period becomes longer.

When an LED needs to be turned on due to the change in light shielding range in the S-Hi mode, the drivers 15L and 15R determine, at step 240, a positive value as a variation in duty ratio for the LED. The positive value has an absolute value that becomes smaller as the channel switching time period becomes longer.

When an LED needs to be turned off due to a change in light shielding range in the S-Hi mode, the drivers 15L and 15R determine, at step 240, a negative value as a variation in duty ratio for the LED. The negative value has an absolute value that becomes smaller as the channel switching time period becomes longer.

For example, the variation in duty ratio is determined to be 0.25, 0.05 or the like. When the variation in duty ratio is 0.25, the LED is switched between on and off states in 4 stages. When the variation in duty ratio is 0.05, the LED is switched between on and off states in 20 stages. Subsequent to step 240, step 250 is performed.

At step 250, the duty ratio of the target LED is changed. Specifically, a value obtained by adding the variation in duty ratio of a target LED to the current duty ratio of the target LED is determined as a new duty ratio of the target LED. Accordingly, the luminance of the target LED varies by an amount corresponding to the variation in duty ratio.

Subsequently, at step 260, it is determined whether the switching of the on/off state of the target LED has been finished. Specifically, if the duty ratio of a target LED is the turn-off value DL or the turn-on value DH, it is determined that the switching has been finished, and control proceeds to step 270. When the duty ratio of the target LED is neither the turn-off value DL nor the turn-on value DH, it is determined that the switching has not been finished, and the processing for the target LED at steps 220 to 270 is terminated.

At step 270, the switching flag for the target LED is turned off, and then the processing for the target LED at steps 220 to 270 is terminated. At step 225, it is determined whether the switching flag for the target LED is turned on. If the switching flag for the target LED is turned on, control proceeds to step 250, and if turned off, the processing for the target LED at steps 220 to 270 is terminated.

By repeating the process shown in FIG. 10, the drivers 15L and 15R turn on the switching flag, at step 230, for an LED which needs to switch between off and on states, and determine a variation in duty ratio at step 240 to thereby vary the duty ratio at step 250.

Thereafter, steps 225, 250 and 260 are performed until the switching is finished and the switching flag is turned off at step 270 to thereby vary the duty ratio of the LED for each control period by an amount corresponding to the aforementioned variation. Thus, the LED gradually changes luminance in multiple stages from an on state to an off state, or vice versa, over the beam switching time period or channel switching time period determined in the process shown in FIG. 11.

Consequently, in the S-Hi mode, the drivers 15L and 15R finally achieve a combination of on and off states of the LEDs 192a to 192k such that the light shielding range in the command outputted from the lamp ECU 11 is not illuminated but the region outside the light shielding range is illuminated.

As described above, according to the present embodiment, the lamp ECU 11 determines a beam switching time period and a channel switching time period in a changeable manner. Furthermore, the drivers 15L and 15R gradually change the luminance of each of the LEDs 192a to 192k between on and off states over the beam switching time period or the channel switching time period.

Thus, the drivers 15L and 15R gradually change the luminance of at least one of the LEDs between on and off states over the switching time period, and the lamp ECU 11 determines the switching time period in a changeable manner. This makes it possible to properly control the time taken for turning on or off the LED according to the situation.

According to the aforementioned embodiment, the combination of the lamp ECU 11 with the drivers 15L and 15R corresponds to an example of the vehicle headlight control apparatus.

Other Embodiments

The present invention is not limited to the aforementioned embodiment and can be changed as appropriate within the scope of the claims. In the aforementioned embodiment, an element constituting the embodiment is not necessarily essential unless, for example, it is explicitly stated that the element is particularly essential or the element is considered to be apparently essential in principle. In the aforementioned embodiment, when a numerical value such as the number, numerical value, amount, or range associated with the components of the embodiment is mentioned, the numerical value is not limited to the specific number unless, for example, it is in explicitly stated that the numerical value is particularly essential or the numerical value is apparently limited to the specific number in principle. In particular, when a plurality of values for an amount are exemplified, a value included in the plurality of values can be adopted unless it is particularly stated elsewhere or it is apparently impossible in principle. In the aforementioned embodiment, when a shape, positional relationship, or the like of a component or the like is mentioned, the shape, positional relationship, or the like is not limited to the specific shape, positional relationship, or the like unless, for example, it is particularly explicitly stated or the shape, positional relationship, tor the like is limited to the specific shape, positional relationship, or the like in principle. The present invention encompasses modifications as below of the aforementioned embodiment. The modifications below can be selectively and independently applied to the aforementioned embodiment. That is, any combination of the modifications is applicable to the aforementioned embodiment, except for an apparently contradictory combination of the modifications.

(Modification 1)

According to the aforementioned embodiment, the lamp ECU 11, the left driver 15L and the right driver 15R are configured as separate units. However, the lamp ECU 11, the left driver 15L, and the right driver 15R are not limited to have such configurations. For example, the lamp ECU 11, the left driver 15L, and the right driver 15R can be all implemented in a single integrated circuit.

(Modification 2)

According to the aforementioned embodiment, in the S-Hi mode, the drivers 15L and 15R cause an LED to switch from an on state to an off state, and another LED to switch from an off state to an on state, according to the variation in light shielding range of the lighting device. Luminance of both of the LEDs is varied over the same channel switching time period.

However, the configuration does not necessarily need to be made as above. For example, in the S-Hi mode, the lamp ECU 11 may differently determine, at step 350 of FIG. 11, the channel switching time period of the LEDs for switching from an on to off state, and that of the LEDs for switching vice versa, and can include the differently determined values in a command to be given to the drivers 15L and 15R. Then, according to the two differently determined channel switching time periods included in the acquired command, the drivers 15L and 15R may control the LEDs 192a to 192k so that the luminance of the LEDs switching from an on to off state and that of the LEDs switching vice versa are varied in different channel switching time periods.

(Modification 3)

According to the aforementioned embodiment, the LEDs 192a to 192k are each exemplified as a target LED whose luminance is gradually changed. However, the target LEDs whose luminance is gradually changed are not limited to such LEDs.

For example, a target LED whose luminance is gradually changed may be only the left Lo-LED 12L, only a combination of the left Lo-LED 12L and the right Lo-LED 12R, only the left Hi-LED 13L, or only a combination of the left Hi-LED 13L and the right Hi-LED 13R.

(Modification 4)

According to the aforementioned embodiment, the LED is used as a light source constituting the headlight of the own vehicle. However, the light source constituting the headlight of the own vehicle is not limited to the LED. Any light source whose luminance is controllable may be used.

REFERENCE SIGNS LIST

11 Lamp ECU
15L Left driver
15R Right driver
12L, 12R Lo-LED
13L, 13R Hi-LED
16L, 16R LED array unit
192a to 192k LED

The invention claimed is:

1. A vehicle headlight control apparatus that controls a headlight of a vehicle, the headlight including at least one light source, comprising:
  a luminance changing section that gradually changes a luminance of the at least one light source between a predetermined on state and a predetermined off state over a switching time period; and
  a time period determining section that determines the switching time period in a changeable manner, wherein:
    the at least one light source comprises a plurality of light sources;
    an S-Hi mode is defined to achieve a light shielding Hi beam state where a lighting part in the plurality of light sources that forms a high beam is turned on and a remaining part in the plurality of light sources is turned off; and the luminance changing section further gradually changes, in the S-Hi mode, a part of the plurality of light sources between the on state and the off state over the switching time period determined by the time period determining section.

2. The vehicle headlight control apparatus as set forth in claim 1, wherein the at least one light source is an LED.

3. The vehicle headlight control apparatus as set forth in claim 1 wherein:
the luminance changing section changes, in the S-Hi mode, a combination of the lighting part that are turned on in the plurality of light sources and the remaining part that is turned off in the plurality of light sources to change a range of an illumination region illuminated by the plurality of light sources and a range of a light shielding region not illuminated by the plurality of light sources in a forward direction of the vehicle.

4. The vehicle headlight control apparatus as set forth in claim 1, wherein the time period determining section changes the switching time period, according to whether a forward vehicle has appeared or disappeared in a captured image of an area ahead of the vehicle.

5. The vehicle headlight control apparatus as set forth in claim 1, wherein the time period determining section changes the switching time period, according to whether a forward vehicle that has disappeared in a captured image of an area ahead of the vehicle is a preceding vehicle or an oncoming vehicle.

6. The vehicle headlight control apparatus as set forth in claim 1, wherein the time period determining section changes the switching time period, according to information associated with brightness around the vehicle.

7. The vehicle headlight control apparatus as set forth in claim 1, wherein the time period determining section reduces the switching time period when a speed of the vehicle is set to a second speed higher than a first speed to be shorter than the switching time period when the speed of the vehicle is set to the first speed.

8. A vehicle headlight control apparatus that controls a headlight of a vehicle, the headlight including at least one light source, comprising:
a luminance changing section that gradually changes a luminance of the at least one light source between a predetermined on state and a predetermined off state over a switching time period; and
a time period determining section that determines the switching time period in a changeable manner, wherein:
the at least one light source comprises a plurality of light sources;
a Lo mode is defined to achieve a Lo beam state where the plurality of light sources forming a high beam are all turned off;
a Hi mode is defined to achieve a Hi beam state where the plurality of light sources forming the high beam are all turned on;
the luminance changing section changes, in an S-Hi mode, a combination of a lighting part in the plurality of light sources and a remaining part in the plurality of light sources; and
when a mode is switched between the Lo mode, the Hi mode, and the S-Hi mode, the luminance changing section gradually changes a luminance of a part of the plurality of light sources between the on state and the off state over the switching time period determined by the time period determining section.

9. The vehicle headlight control apparatus as set forth in claim 8 wherein:
when the mode is switched between the Lo mode, the Hi mode, and the S-Hi mode due to a user's mode switching operation, the time period determining section reduces the switching time period shorter than when the mode is switched due to a factor other than the user's mode switching operation.

10. The vehicle headlight control apparatus as set forth in claim 8 wherein:
when the mode is switched between the Lo mode, the Hi mode, and the S-Hi mode such that the number of light sources being turned on in the plurality of light sources is reduced, the time period determining section reduces the switching time period shorter than when the mode is switched between the Lo mode, the Hi mode, and the S-Hi mode such that the number of light sources being turned on in the plurality of light sources increases.

11. The vehicle headlight control apparatus as set forth in claim 8, wherein the at least one light source is an LED.

12. The vehicle headlight control apparatus as set forth in claim 8 wherein:
the luminance changing section turns off all the plurality of light sources in the Lo mode;
the luminance changing section turns on all the plurality of light sources in the Hi mode; and
the luminance changing section changes, in the S-Hi mode, changes the combination of the lighting part in the plurality of light sources and the remaining part in the plurality of light sources, the lighting part in the plurality of light sources being turned on, the remaining part in the plurality of light sources being turned off, change of the combination changing a range of an illumination region illuminated by the plurality of light sources and a range of a light shielding region not illuminated by the plurality of light sources in a forward direction of the vehicle.

13. The vehicle headlight control apparatus as set forth in claim 8 wherein:
when the mode is switched between the Lo mode, the Hi mode, and the S-Hi mode due to a user's mode switching operation, the luminance changing section reduces the switching time period shorter than when the mode is switched due to a factor other than the user's mode switching operation.

14. The vehicle headlight control apparatus as set forth in claim 8 wherein:
when the mode is switched between the Lo mode, the Hi mode, and the S-Hi mode such that the number of light sources being turned on in the plurality of light sources is reduced, the luminance changing section reduces the switching time period shorter than when the mode is switched between the Lo mode, the Hi mode, and the S-Hi mode such that the number of light sources being turned on in the plurality of light sources increases.

15. The vehicle headlight control apparatus as set forth in claim 8, wherein the time period determining section reduces the switching time period when a speed of the vehicle is set to a second speed higher than a first speed to be shorter than the switching time period when the speed of the vehicle is set to the first speed.

16. The vehicle headlight control apparatus as set forth in claim 8, wherein the time period determining section changes the switching time period, according to whether a forward vehicle has appeared or disappeared in a captured image of an area ahead of the vehicle.

17. The vehicle headlight control apparatus as set forth in claim 8, wherein the time period determining section changes the switching time period, according to whether a forward vehicle that has disappeared in a captured image of an area ahead of the vehicle is a preceding vehicle or an oncoming vehicle.

18. The vehicle headlight control apparatus as set forth in claim 8, wherein the time period determining section changes the switching time period, according to information associated with brightness around the vehicle.

19. A vehicle headlight control apparatus that controls a headlight of a vehicle, the headlight including at least one light source, comprising:
- a luminance changing section that gradually changes a luminance of the at least one light source between a predetermined on state and a predetermined off state over a switching time period; and
- a time period determining section that determines the switching time period in a changeable manner,
- wherein the time period determining section is configured to:
  - obtain an image of a forward section of the vehicle;
  - determine a first value of the switching time period if a forward vehicle has appeared in the image;
  - determine a second value of the switching time if the forward vehicle has disappeared in the image, the second value being longer than the first value;
  - determine a third value of the switching time period if an oncoming vehicle has appeared in the image; and
  - determine a fourth value of the switching time if the oncoming vehicle has disappeared in the image, the fourth value being shorter than the third value.

* * * * *